United States Patent [19]
Evans et al.

[11] 3,859,841
[45] Jan. 14, 1975

[54] CUSHIONING MATERIAL TEST DEVICE
[75] Inventors: Ernest C. Evans; Clarence E. Gurnee, both of Appleton, Wis.
[73] Assignee: Kimberly-Clark Corporation, Neenah, Wis.
[22] Filed: May 11, 1972
[21] Appl. No.: 252,243

[52] U.S. Cl. .......................... 73/12, 73/79
[51] Int. Cl. ............................ G01n 3/30
[58] Field of Search............. 73/12, 79; 116/114 AH

[56] References Cited
UNITED STATES PATENTS
| | | | |
|---|---|---|---|
| 2,843,076 | 7/1958 | Cook et al. | 116/114 AH |
| 3,266,289 | 8/1966 | Stamy | 73/12 |
| 3,365,929 | 1/1968 | Messner | 73/12 |

FOREIGN PATENTS OR APPLICATIONS
228,710  11/1910  Germany .................. 73/79

Primary Examiner—James J. Gill
Attorney, Agent, or Firm—Kimberly-Clark Corporation

[57] ABSTRACT

A device for the measurement on a comparative basis of cushioning properties of materials. A guided capsule releasably carrying a shuttle is arranged to be directed against cushioning material at such impact value that the shuttle is jolted from the capsule. Means are provided to indicate the relative impact value necessary to cause a release of the shuttle for any particular material. Energy absorption values of a material are indicated by the shuttle action; dampening values of a material are indicated by the rebound height of the capsule with the shuttle removed.

5 Claims, 6 Drawing Figures

PATENTED JAN 14 1975

PATENTED JAN 14 1975 3,859,841

CUSHIONING MATERIAL TEST DEVICE

FIELD OF THE INVENTION

This invention is concerned with means and methods to quickly evaluate the cushioning characteristics of materials, particularly the energy absorption and dampening qualities of packaging materials.

BACKGROUND OF THE INVENTION

Methods for the determination of the static and dynamic characteristics of cushioning materials are available. Such commonly involve relatively sophisticated equipment which permits the attainment of "G" values, pressure loadings, stressstrain curves, creep and transmissibility values and the like. Such equipment is not portable and not readily available to those in the field interested in evaluating cushioning materials on a comparative basis. This invention provides an instrument which is portable, readily disassembled for transport, readily erected as a complete unit for material testing on a comparative basis and thoroughly reliable for its intended purpose of providing reproducible results commonly found in more elaborate equipment.

Basically, the instrument is an impact test device capable of direct and convenient use to indicate the energy absorption and dampening characteristics of materials. The energy absorption is indicated by making a measurement based on imparting to a releasably held shuttle a force sufficient to separate it from a capsule which is directed against the material to be tested; most conveniently, the measurement found for materials undergoing test are compared with values for known cushioning products to provide the indication desired. For dampening characteristics the rebound height of the capsule only may be measured. The instrument is graduated with a convenient scale and, if desired, data obtained with the instrument may be translated into numerical values of pressure loadings and the like. Such, however, is not the primary objective of the device.

The invention will be more fully understood by reference to the following detailed description and accompanying drawings wherein.

Figure 1:
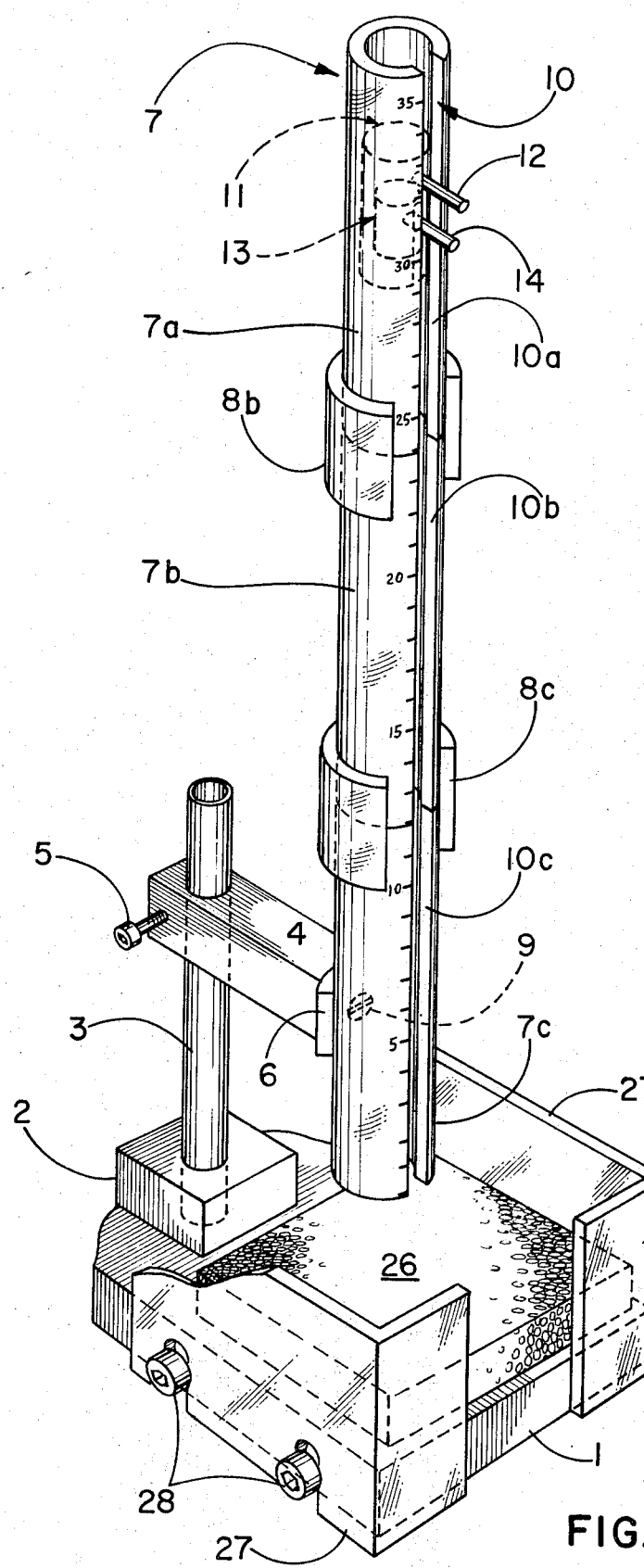
FIG. 1 is a perspective view of equipment in accordance with the invention.
Figure 2:
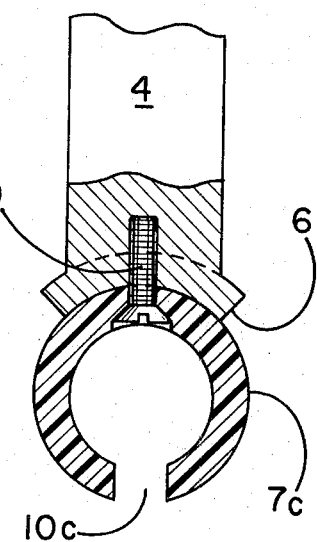
FIG. 2 is a fragmentary view of a portion of the equipment of FIG. 1.

Referring now more in detail to the drawings, the numeral 1 in FIG. 1 indicates a generally rectangular relatively thick base suitably of a clear rigid plastic material. The base 1 has integral with it a mounting block 2 at a rearward end of the base. This also is of a clear rigid plastic. A cylindrical and hollow support rod of metal designated at 3 is received in the mounting block 2 and itself receives a support arm 4 which extends horizontally over the base 1 toward the front of the base. This support arm 4 is retained in fixed vertically adjusted position on the rod 3 by set screw 5. The support arm 4, as most clearly shown in FIG. 2, has an enlarged forward end 6 contoured to receive a cylindrical tube 7.

The tube 7 is of clear rigid plastic and formed in three sections designated from top to bottom (FIG. 1) as 7a, 7b, and 7c.

The sections 7b and 7c each carry collar-like upwardly extending projections which telescope with the tubular section immediately there-above. That is, the section 7b telescopes with the collar 8c mating so that the section 7b registers with the section 7c. A flat, counter-sunk screw 9 secures the lower section 7c to the enlarged forward end 6 of the support arm 4. The screw 9 is counter-sunk so that it will not obstruct the bore of the tube 7.

The tube 7 has a slot 10 extending over its full length. The slot 10 is formed by slots in each of the sections, the section slots being designated at 10a, 10b and 10c. These slots communicate the bore of the tube with the exterior of the apparatus.

As illustrated in FIG. 1, a capsule 11 is confined within the tube 7 and is arranged so that it may fall freely under the influence of gravity toward the base 1.

As is clearly shown in the drawing, the tube 7 is graduated over its length so that the initial starting point of the capsule 11 may be selected by an operator of the equipment.

The capsule 11 carries a fixed finger grip and guide pin 12 which projects from the capsule through the slot 10, and which rides in the slot 10 as the capsule moves toward the base 1 in the operation of the equipment. Thus, the pin 12 orients the capsule with relation to the tube 7.

The capsule includes a shuttle 13 which is suitably of a light weight material such as wood, aluminum or the like. The shuttle includes (Fig. 1) a projecting rod 14 which extends through slot 11b of the capsule and also through slot 10 of the tube 7. Thus, the rod 14 rides in the slot 10 below the guide pin 12 of the capsule.

Figure 3:
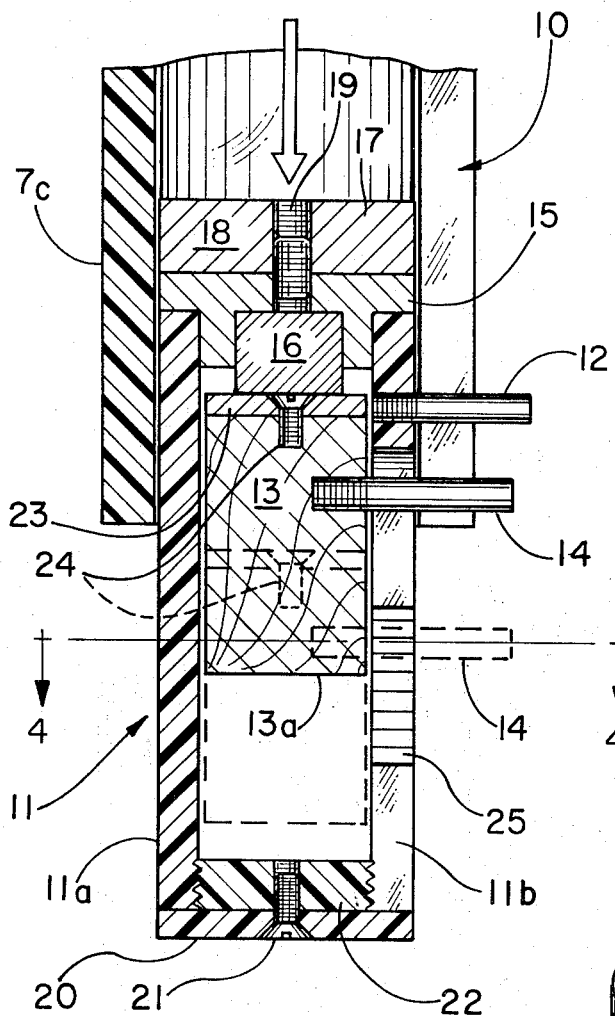
FIG. 3 is a sectional view wth parts shown in phantom illustrating generally the mode of operation of the equipment.
Figure 4:
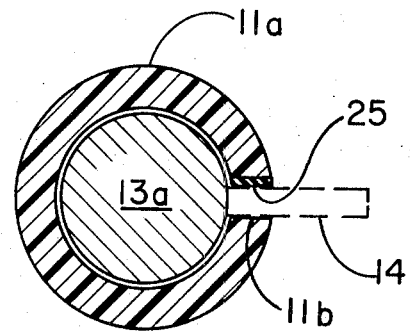
FIG. 4 is a sectional view on line 4—4 of FIG. 3.

The capsule 11 is provided with a cap 15 which has embedded in it a magnet 16 (Fig. 3). The cap closes the upper end of the capsule and is itself threaded at 17. A threaded brass weight 18 which may be selected to have various values is retained by a brass screw 19 threadedly received in the weight 18 aud cap 15. The capsule also includes a bottom flat cap of plastic but suitably of a distinct color such as red so that it may be conveniently viewed through the tube 7.

A screw 21 engaged with the threaded disc 22 retained threadedly in the lower wall of the capsule serves to hold the bottom cap 20 in position.

The shuttle includes a material having magnetic attraction such as a magnetizable flat disc 23 of soft iron or the like. The disc 23 is retained in position on the body 13a of the shuttle by screw 24. As is most clearly shown in FIG. 3 in solid line, normally the disc 23 is engaged and retained by the magnet 16. However, when the capsule is subjected to a force in the axial direction sufficient to dislodge the shuttle 13, the shuttle will drop to the position indicated in phantom. The projecting shuttle rod 14 will now move in the slot 11b of the capsule and be engaged by a length of rubber stripping 25 which projects into the slot from a side wall of the capsule.

It will now be apparent that in the operation of the device a sample as indicated at 26 may be placed on the base 1 below the lower end of the tube 7. Side walls 27 retained by bolts 28 may be positioned to prevent any accidental movement of the capsule from the base.

In operation with sample 26 in position the capsule is raised to a definite height such that the bottom cap 20 is brought opposite a particular index line of the tube 7. At this time the rod 14 has been employed to move the magnetizable disc 23 against the magnet 16. The capsule is permitted to drop through the bore of the tube 7 with the pin 12 and rod 14 in the position indicated in FIG. 1.

When the base or bottom cap 20 is urged by the weight of the falling capsule to the resilient material 26, a force is imparted through the walls of the capsule to the junction of the magnet 16 and disc 23. If the inertia of the capsule and the shuttle 13 including the disc 23 is sufficient to cause the force between the magnet and disc to be overcome, the shuttle will be jolted free to move toward the bottom end of the capsule and to bring the rod 14 into contact with the rubber stripping 25. The stripping 25 limits the length of movement of the shuttle away from the magnet and upper end of the capsule.

In the event that in a first fall of the capsule the force is insufficient to jolt the shuttle free from the magnet 16, the test is repeated at higher levels of start in the tube 7 until the force does become sufficient to effect displacement of the shuttle.

It will be appreciated that the body 13 of the shuttle may be very light weight, in which case for a given magnet and disc 23 a relatively great height may be necessary to jolt the shuttle free. In this event the shuttle may be replaced very conveniently with one of greater mass by simply replacing the shuttle through the bottom of the capsule by suitable removal of the cap 20 and disc 22.

Figure 6:
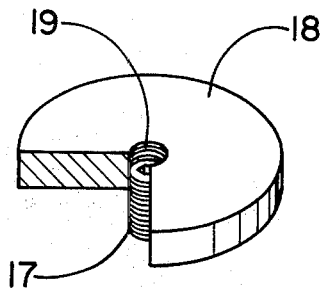
FIG. 6 is a view partially in section of a weight useful in connection with the equipment of FIG. 3.
Figure 5:
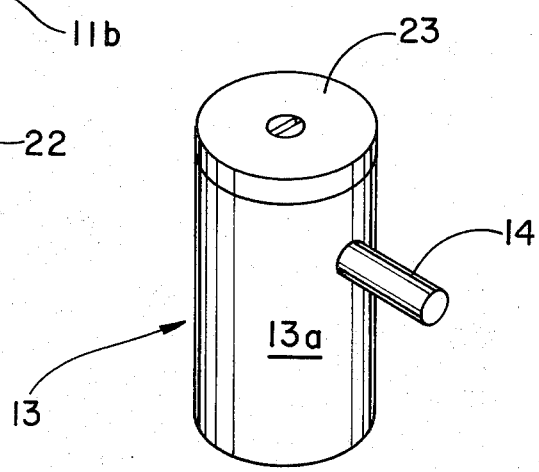
FIG. 5 is a perspective view of the shuttle illustrated in FIG. 3.

A wide variety of test pieces may be included in the equipment arrangement since the body 13 (Fig. 5) may have considerably different masses dependent upon the nature of the material. Additionally, the mass of the capsule itself may be altered by selecting different materials or different sizes of materials for the weight 18 (Fig. 6). As is clearly shown in the drawing, equipment may be readily disassembled for convenient transport and, accordingly, is very useful in the field for the making of comparative measurements between different classes of cushioning materials. Basically, the equipment is intended for this purpose. However, it is apparent from the foregoing description by correlating the various parameters including capsule mass, shuttle mass, magnetic field strength and tube indicia, one may develop a relationship to values for energy absorption criteria.

It may also be noted that the capsule alone in the absence of the shuttle may be employed to determine the dampening characteristics of cushioning materials. This is accomplished by measuring the rebound height of the capsule when dropped from a standard position above the cushioning material.

It is to be noted that in the use of the device the tube 7 is positioned toward the material to be tested to an extent that the distance between the tube and the material is significantly less than the height of the capsule. This will permit the capsule, after impact, to be retained partially within the tube so that the capsule moves only lineally in the making of a test and does not tilt.

As many apparently widely different embodiments of this invention may be made without departing from the spirit and scope thereof, it is to be understood that I do not limit myself to the specific embodiments thereof except as defined in the appended claims.

We claim:

1. An impact test device comprising a vertically extending tube having an open lower end, a base spaced below the lower end of the tube and adapted to retain on the upper side thereof fronting toward said tube a product to be impact tested, a capsule confined within the bore of the tube for movement axially of the tube toward the open tube end, said capsule being of such an axial dimension that it may project through the said lower open tube end to impact a product on the base while the upper end of the capsule is retained within the tube, a shuttle confined within the capsule of lesser axial dimension than the capsule and capable of movement axially from an upper end of the capsule toward a lower end of the capsule, cooperable means carried by the shuttle and capsule for releasably retaining the shuttle at an upper end of the capsule, means independent of the capsule for raising the shuttle from a released position to the secured position at the upper end of the capsule and means independent of the shuttle for raising the capsule with the shuttle therein upwardly in the said tube.

2. An impact test device comprising a vertically extending tube having an open lower end, a base spaced below the lower end of the tube and adapted to retain on the upper side thereof fronting toward said tube a product to be impact tested, a capsule confined within the bore of the tube for movement axially of the tube toward the open tube end, said capsule being of such an axial dimension that it may project through the said lower open tube end to impact a product on the base while the upper end of the capsule is retained within the tube, a shuttle confined within the capsule of lesser axial dimension than the capsule and capable of movement axially from an upper end of the capsule toward a lower end of the capsule, cooperable magnetic means carried by ththe shuttle and capsule for releasably retaining the shuttle at an upper end of the capsule, said tube having in the periphery thereof an axially extending slot, the capsule having a rod projecting through the said slot to permit raising of the capsule in the tube, and the capsule also having in the periphery thereof an axially extending slot arranged to lie coincident with the slot of the tube, and the shuttle having a rod projecting through the slot of the capsule whereby the shuttle may be raised from a lower capsule end to an upper capsule end to attach the capsule and shuttle together.

3. An impact test device comprising a vertically extending tube having an open lower end, a base spaced below the lower end of the tube and adapted to retain on the upper side thereof fronting toward said tube a product to be impact tested, a capsule confined within the bore of the tube for movement axially of the tube toward the open tube end, said capsule being of such an axial dimension that it may project through the said lower open tube end to impact a product on the base while the upper end of the capsule is retained within the tube, a shuttle confined within the capsule of lesser axial dimension than the capsule and capable of movement axially from an upper end of the capsule toward a lower end of the capsule, cooperable magnetic means carried by the shuttle and capsule for releasably retaining the shuttle at an upper end of the capsule, said tube having in the periphery thereof an axially extending slot, the capsule having a rod projecting through the said slot to permit raising of the capsule in the tube, and the capsule also having in the periphery thereof an axially extending slot arranged to lie coincident with the slot of the tube, and the shuttle having a rod projecting through the slot of the capsule whereby the shuttle may be raised from a lower capsule end to an upper capsule end to attach the capsule and shuttle together, and said capsule having means projecting into the slot thereof to grasp and hold the rod projecting through the slot as the rod is urged axially in the slot.

4. An impact test device comprising a base for retaining on an upper surface thereof a sample to be impact tested, a tube extending vertically above the base and having a lower open end thereof in spaced relation with the base, holder means retaining the sad tube in the said spaced relation, said tube having longitudinally extending sections in abutting relation providing the overall length of tube, a collar retained by one tube section of each abutting pair of sections, said collar projecting from the periphery of one section axially of the section to receive the adjacent section, a capsule slidably confined within the tube for movement axially of the tube toward the said lower open end of the tube, said capsule being of such dimension axially of the tube that it may project from the said lower end of the tube to impact a sample on the base while the upper end of the capsule is retained within the tube, a shutle confined within the capsule and of lesser axial dimension than the capsule so that it may move from an upper end of the capsule toward a lower end upon the application of sufficient force to the shuttle, magnetic means for releasably retaining the shuttle in an upper end of the capsule, said tube having a first slot in the periphery thereof extending axially of the tube and said capsule having a slot in the periphery thereof extending axially of the capsule and communicating the interior of the capsule through the first said slot with the exterior of the said tube, resilient means projecting into the slot of the capsule intermediate the length of the slot well below the upper end of the capsule, a finger grip and guide pin projecting from the capsule through the slot of the said tube to permit raising the capsule in the said tube, and a rod projecting from the shuttle through the overlying slots to permit moving the shuttle to the upper end of the capsule, said rod being of such dimension as to engage and be retained by said resilient means when said shuttle is subjected to a force to cause it to move toward the lower end of the capsule.

5. In a process of comparing the energy absorption characteristics of materials, the steps of releasably supporting a shuttle within a capsule, impelling the capsule and so supported shuttle in a linear direction against a material to be tested to cause the capsule to be subjected to a shock force in the lineal direction, supporting the capsule laterally during the capsule travel and during impact with the material, initially subjecting the capsule to a shock force insufficient to separate the shuttle from the capsule and then repeating the subjection of the capsule and shuttle to higher levels of shock to attain the shock force necessary to separate the shuttle from the capsule whereby an indication of the energy absorption characteristic of the material is indicated.

* * * * *